(12) United States Patent
Wang et al.

(10) Patent No.: US 12,223,630 B2
(45) Date of Patent: Feb. 11, 2025

(54) IMAGE DATA PROCESSING METHOD, SYSTEM AND ELECTRONIC DEVICE DETERMINING SIMILAR TARGET IMAGE

(71) Applicant: Air Force Medical Center, PLA, Beijing (CN)

(72) Inventors: Guangyun Wang, Beijing (CN); Qiao Ye, Beijing (CN); Ruibo Qi, Jiangsu (CN); Yuan Luo, Beijing (CN); Zhusong Mei, Beijing (CN); Bingqian Guo, Beijing (CN); Longmei Fang, Beijing (CN); Chengxiang Zhu, Jiangsu (CN); Guiling Bi, Jiangsu (CN); Yao Li, Jiangsu (CN); Yin Zhang, Jiangsu (CN)

(73) Assignee: Air Force Medical Center, PLA, Beijing (CN)

(*) Notice: Subject to any disclaimer, the term of this patent is extended or adjusted under 35 U.S.C. 154(b) by 0 days.

(21) Appl. No.: 18/764,606

(22) Filed: Jul. 5, 2024

(65) Prior Publication Data
US 2025/0022109 A1    Jan. 16, 2025

(30) Foreign Application Priority Data
Jul. 10, 2023    (CN) .......................... 202310835675.7

(51) Int. Cl.
*G06T 5/00*    (2024.01)
*G06T 5/50*    (2006.01)
(Continued)

(52) U.S. Cl.
CPC .................. *G06T 5/73* (2024.01); *G06T 5/50* (2013.01); *G06V 10/36* (2022.01); *G06V 10/761* (2022.01);
(Continued)

(58) Field of Classification Search
CPC .... G06T 1/00; G06T 5/00; G06T 7/00; G06T 2201/00; G06T 5/73; G06T 2207/20004; G06T 2207/20172
See application file for complete search history.

(56) References Cited

U.S. PATENT DOCUMENTS

2004/0101169 A1    5/2004    Tisse et al.
2011/0249910 A1*   10/2011   Henderson ........... G06V 10/993
                                                           382/278
(Continued)

FOREIGN PATENT DOCUMENTS

CN    108960290 A    12/2018
CN    110109878 A     8/2019
(Continued)

OTHER PUBLICATIONS

Her, Lilin, and Xiaojun Yang. "Research of image sharpness assessment algorithm for autofocus." 2019 IEEE 4th International Conference on Image, Vision and Computing (ICIVC). IEEE, 2019.*
(Continued)

*Primary Examiner* — Li Liu

(57) ABSTRACT

An image data processing method, a system and an electronic device are provided. The method includes: recording to-be-processed database data as a target image set; performing sharpness calculation on target images in the target image set by a weighted gradient algorithm, and removing, if sharpness of at least one target image is smaller than a threshold, the at least one target image from the target image set; performing sharpness enhancement processing on remaining target images in the target image set; extracting feature points in the target images in the target image set and the contrast image, one by one or at intervals; and comparing and judging similarity between the target images and the
(Continued)

contrast image by a similarity algorithm, and inputting similar target images into classified storage spaces.

8 Claims, 1 Drawing Sheet

(51) Int. Cl.
- *G06T 5/73* (2024.01)
- *G06V 10/36* (2022.01)
- *G06V 10/74* (2022.01)
- *G06V 10/764* (2022.01)

(52) U.S. Cl.
CPC .. *G06V 10/764* (2022.01); *G06T 2207/30168* (2013.01)

(56) References Cited

U.S. PATENT DOCUMENTS

| | | | |
|---|---|---|---|
| 2013/0051676 A1* | 2/2013 | Wehnes | G06F 18/24 382/190 |
| 2016/0241790 A1* | 8/2016 | Du | H04N 23/743 |
| 2018/0253839 A1* | 9/2018 | Zur | A61B 1/000094 |
| 2021/0150164 A1* | 5/2021 | Schneider | H04N 23/12 |

FOREIGN PATENT DOCUMENTS

| | | |
|---|---|---|
| CN | 113391439 A | 9/2021 |
| CN | 114120364 A | 3/2022 |
| CN | 115330644 A | 11/2022 |
| CN | 115661803 A | 1/2023 |
| WO | 2022027821 A1 | 2/2022 |

OTHER PUBLICATIONS

Zhu, Mengqiu, et al. "A survey on objective evaluation of image sharpness." Applied Sciences 13.4 (2023): 2652.*

Ma, Xiaoyu, and Qiaoling Li. "Auto-focus algorithm based on improved SML evaluation function." AOPC 2019: Optical Sensing and Imaging Technology. vol. 11338. SPIE, 2019.*

Gao, Shuqin, Min Han, and Xu Cheng. "The fast iris image clarity evaluation based on Tenengrad and ROI selection." Ninth International Conference on Graphic and Image Processing (ICGIP 2017). vol. 10615. SPIE, 2018.*

Deling Mi et al., A Multi-Focus Image Fusion Algorithm Based on the Calculation of Clarity in NSCT Domain, Optics & Optoelectronic Technology, Apr. 2010, pp. 7-10, vol. 8, No. 2.

Notice of Allowance of counterpart Chinese Patent Application No. 202310835675.7 issued on Aug. 25, 2023.

First Office Action of counterpart Chinese Patent Application No. 202310835675.7 issued on Aug. 12, 2023.

* cited by examiner

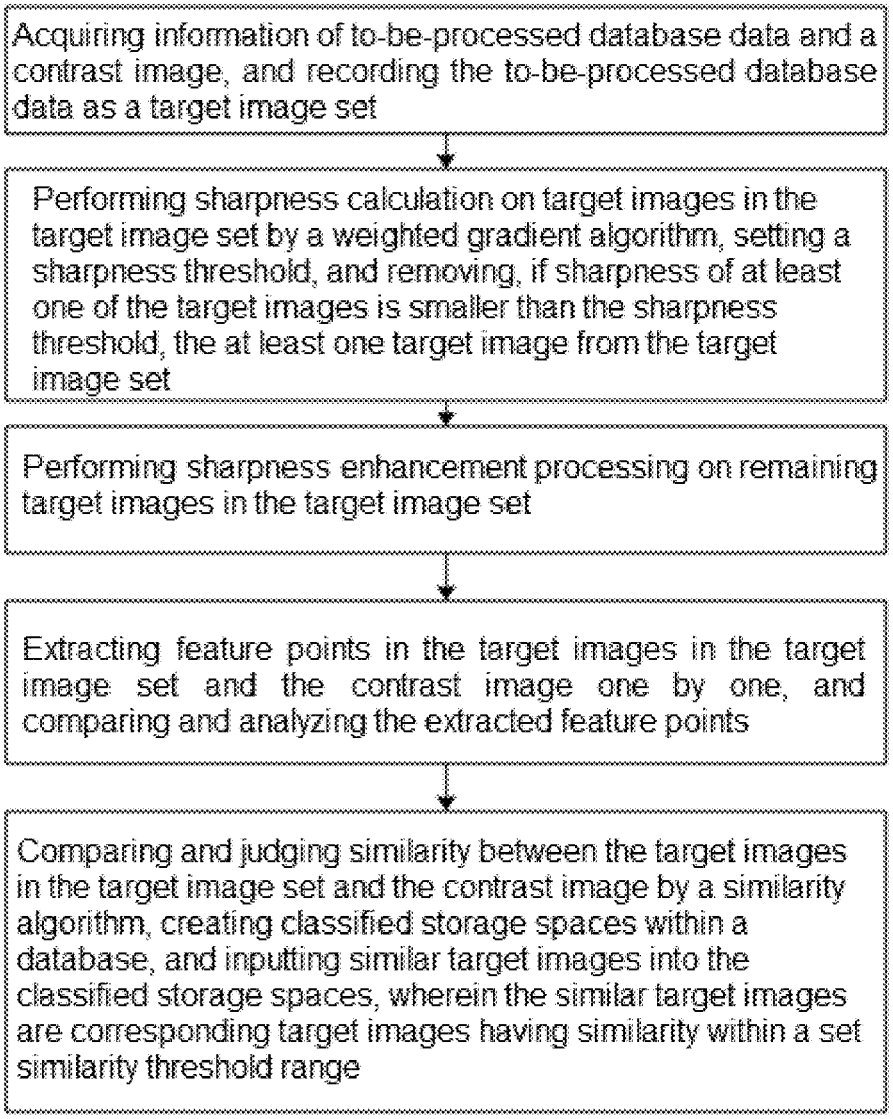

IMAGE DATA PROCESSING METHOD, SYSTEM AND ELECTRONIC DEVICE DETERMINING SIMILAR TARGET IMAGE

CROSS REFERENCE TO RELATED APPLICATIONS

The present disclosure claims priority to the Chinese patent application with the filing No. 2023108356757 filed with the China National Intellectual Property Administration on Jul. 10, 2023, and entitled "IMAGE DATA PROCESSING METHOD, SYSTEM AND ELECTRONIC DEVICE", contents of which are incorporated herein by reference in their entirety.

TECHNICAL FIELD

The present disclosure relates to the technical field of image data processing, and specifically to an image data processing method, a system and an electronic device.

BACKGROUND ART

Image data processing refers to a method of performing certain processing on an image so as to make the image meet a demand, for example, front cover pushing, image classification and image retrieval. At present, a similarity comparison algorithm is generally adopted for implementing extraction and processing of a large number of similar image data in a database, where feature points between the image data are analyzed according to similarity comparison, thereby completing extraction of the image data.

Chinese patent application with publication No. CN114120364A discloses an image processing method, image classification method and apparatus, a medium and an electronic device, including: receiving a to-be-processed image; determining a noise image corresponding to the to-be-processed image according to the to-be-processed image and an image processing model, wherein the image processing model includes an image feature extraction submodel and a noise information submodel, the image feature extraction submodel is used for acquiring a feature vector of the to-be-processed image, the noise information submodel is used for determining the noise image of the to-be-processed image according to the feature vector of the to-be-processed image, the image processing model further includes a classification submodel during training, and loss of the image processing model is determined based on a noise vector added by the noise information submodel and classification probability distribution output by the classification submodel; and generating a target image corresponding to the to-be-processed image according to the to-be-processed image and the noise image, wherein classifications corresponding to the to-be-processed image and the target image are the same.

However, in the above method, after the image data is shot by some devices, the image data is not clear enough due to influences of environment and other factors, and further when the similarity comparison algorithm is adopted to extract the feature points in the image data, the extracted feature points are not clear enough, and the image data cannot be accurately extracted or processed. Therefore, the present solution proposes a method for performing sharpness pre-processing on image data, so as to facilitating subsequent further extraction and analysis or processing on the image data.

SUMMARY

The present disclosure aims at providing an image data processing method, a system and an electronic device, so as to solve problems provided in the above Background Art.

A first objective of the present disclosure is to provide an image data processing method, including the following steps:

S1, acquiring information of to-be-processed database data and a contrast image, and recording the to-be-processed database data as a target image set;

S2, performing sharpness calculation on target images in the target image set by a weighted gradient algorithm, setting a sharpness threshold, and removing, if sharpness of at least one of the target images is smaller than the sharpness threshold, the at least one target image from the target image set;

S3, performing sharpness enhancement processing on remaining target images in the target image set;

S4, extracting feature points in the target images in the target image set and the contrast image one by one, and comparing and analyzing the extracted feature points; and S5, comparing and judging similarity between the target images in the target image set and the contrast image by a similarity algorithm, creating classified storage spaces within a database, and inputting similar target images into the classified storage spaces, wherein the similar target images are corresponding target images having similarity within a set similarity threshold range.

Further, in the S1, the image data in the target image set is classified according to time, and target image subsets $\{T1\}, \{T2\} \ldots \{Tn\}$ of different time categories are created.

Further, in the S2, a method of performing sharpness calculation on the target images in the target image set by the weighted gradient algorithm is as follows:

$$D(f) = \alpha \Sigma_x \Sigma_y |f(x+2,y) - f(x,y)|^2 + \beta \Sigma_x \Sigma_y |G(x,y)|;$$

in the formula, $D(f)$ is sharpness, $f(x,y)$ is a gray-scale value of a corresponding pixel point $(x, y)$ of a target image f, x and y respectively represent abscissa and ordinate of the pixel point, $G(x, y)$ is convolution of Laplacian operator of the pixel point and $(x, y)$, $\alpha$ and $\beta$ are weighted values, and $\alpha + \beta = 1$.

Further, in the S3, the sharpness enhancement processing includes mean filtering denoising processing and adaptive threshold binarization enhancement processing.

Further, when determining the target image subset to which a similar target image belongs, similarity judgement is performed on the target image in the target image subset it belongs to and in target image subsets before and after the target image subset it belongs to.

Further, a calculation formula of the similarity algorithm is as follows:

$$W/P 100\% = G;$$

In the formula: $W$ is a feature point of the target image, $P$ is a feature point of the contrast image, and $G$ is a ratio of the feature point $W$ of the target image to the feature point $P$ of the contrast image, i.e., similarity; and when $G \in [0.7, 1]$, it is determined that the similarity between the target image and the contrast image is large.

Further, in the S4, the mode of extracting the image data one by one, which is called as one-by-one extraction is switched to extraction at intervals, which is called as interval extraction, the number of the intervals is set as n, where n is an integer greater than 1. When $G\in(0.9,1]$, n is 1, when $G\in(0.8,0.9]$, n is 2, when $G\in[0.7,0.8]$, n is 3, and when $G\in(0,0.7)$, n is 4.

A second objective of the present disclosure is to provide a system generated according to the above image data processing method, at least including:

an extraction module, configured to acquire information of to-be-processed database data and a contrast image, and record the to-be-processed database data as a target image set;

a sharpness processing module, configured to perform sharpness calculation on target images in the target image set by a weighted gradient algorithm, set a sharpness threshold, and remove, if sharpness of at least one of the target images is smaller than the sharpness threshold, the at least one target image from the target image set; and perform sharpness enhancement processing on remaining target images in the target image set;

a similarity calculation module, configured to extract feature points in the target images in the target image set and the contrast image one by one, and compare similarity between the target images and the contrast image by a similarity algorithm according to the feature points;

a data storage module, configured to create classified storage spaces, and input similar target images into respective classified storage spaces, wherein the similar target images are corresponding target images having similarity within a set similarity threshold range; and a control module, configured to switch image extraction modes, to choose to use one-by-one extraction or extraction at intervals.

A third object of the present disclosure is to provide an electronic device, including:

a processor; and a memory, for storing computer programs, wherein when the computer programs are executed by the processor, the processor is caused to execute the steps in the image data processing method according to any one of the above.

Compared with the prior art, the present disclosure has the following beneficial effects:

1. In the image data processing method, system and electronic device, by marking the image data as target images, and performing sharpness calculation on the target images in the target image set by the weighted gradient algorithm, image data with poor sharpness is removed, and meanwhile sharpness enhancement processing is performed on the remaining target images, extraction error of feature points is reduced, and the image data is accurately analyzed.

2. In the image data processing method, system and electronic device, by classifying the image data according to time, and based on similarity calculation, the intervals of the interval extraction are adjusted in real time, and the previous mode of one-by-one extraction and comparison is changed, thus accelerating efficiency of comparing and processing the image data in the database.

BRIEF DESCRIPTION OF DRAWINGS

The sole FIGURE is an overall flowchart of the present disclosure.

DETAILED DESCRIPTION OF EMBODIMENTS

The technical solutions in the embodiments of the present disclosure will be clearly and completely described below in combination with the drawing in the embodiments of the present disclosure. Obviously, the embodiments described are only some embodiments of the present disclosure, and not all of the embodiments. All of other embodiments, obtained by those ordinarily skilled in the art based on the embodiments in the present disclosure without paying any inventive efforts, shall fall into the scope of protection of the present disclosure.

Embodiment 1

Referring to the sole FIGURE, the present embodiment provides an image data processing method, including following steps:

S1, acquiring information of to-be-processed database data and a contrast image, and recording the to-be-processed database data as a target image set;

S2, performing sharpness calculation on target images in the target image set by a weighted gradient algorithm, setting a sharpness threshold, and removing, if sharpness of at least one of the target images is smaller than the sharpness threshold, the at least one target image from the target image set;

S3, performing sharpness enhancement processing on remaining target images in the target image set;

S4, extracting feature points in the target images in the target image set and the contrast image one by one, and comparing and analyzing the extracted feature points; and S5, comparing and judging similarity between the target images in the target image set and the contrast image by a similarity algorithm, creating classified storage spaces within a database, and inputting similar target images into the classified storage spaces, wherein the similar target images are corresponding target images having similarity within a set similarity threshold range.

In S1, the image data in the target image set is classified according to time, and target image subsets $\{T1\}, \{T2\} \ldots \{Tn\}$ of different time categories are created. The images are sorted according to a time sequence, so that images of the same scene may be effectively clustered, and meanwhile, the images are subdivided into subsets, so as to improve image processing efficiency by means of block processing.

In S2, a method of performing sharpness calculation on the target images in the target image set by the weighted gradient algorithm is as follows:

$$D(f)=\alpha\Sigma_x\Sigma_y|f(x+2,y)-f(x,y)|^2+\beta\Sigma_x\Sigma_y|G(x,y)|;$$

In the formula, $D(f)$ is sharpness, $f(x,y)$ is a gray-scale value of a corresponding pixel point $(x,y)$ of a target image f, x and y respectively represent abscissa and ordinate of the pixel point, $G(x,y)$ is convolution of Laplacian operator of the pixel point $(x,y)$, $\alpha$ and $\beta$ are weighted values, and $\alpha+\beta=1$, wherein the weighted values may be obtained by machine learning training, and accuracy of judging the image sharpness may be improved by using different weighted values in different scenes.

In S3, the sharpness enhancement processing includes mean filtering denoising processing and adaptive threshold binarization enhancement processing.

In S5, the target image subset to which the similar target image belongs is judged, and similarity judgement is performed on the target images in the target image subset and in preceding and following target image subsets; and a screening area is narrowed down according to a time line, which greatly improves an image processing rate.

A calculation formula of the similarity algorithm is as follows:

$$W/P 100\% = G;$$

In the formula: $W$ is a feature point of a target image, $P$ is a feature point of a contrast image, and $G$ is a ratio of the feature point $W$ of the target image to the feature point $P$ of the contrast image, i.e., similarity. When $G \in [0.7,1]$, it is determined that the similarity between the target image and the contrast image is large, i.e., $G \in [0.7,1]$ is the set similarity threshold range.

In S4, the mode of extracting the image data one by one is switched to extraction at intervals. The number of intervals is set as n, where n is an integer greater than 1. When $G \in (0.9,1]$, n is 1, when $G \in (0.8,0.9]$, n is 2, when $G \in [0.7,0.8]$, n is 3, and when $G \in (0,0.7)$, n is 4. By controlling the number of intervals, more image data is extracted when the similarity is high, and few image data is extracted when the similarity is low, thereby ensuring accuracy of image extraction and improving extraction efficiency.

Embodiment 2

The present embodiment provides a system generated based on an image data processing method, at least including:
- an extraction module, configured to acquire information of to-be-processed database data and a contrast image, and record the to-be-processed database data as a target image set;
- a sharpness processing module, configured to perform sharpness calculation on target images in the target image set by a weighted gradient algorithm, set a sharpness threshold, and remove, if sharpness of at least one of the target images is smaller than the sharpness threshold, the at least one target image from the target image set; and perform sharpness enhancement processing on remaining target images in the target image set;
- a similarity calculation module, configured to extract feature points in the target images in the target image set and the contrast image one by one, and compare similarity between the target images and the contrast image by a similarity algorithm according to the feature points;
- a data storage module, configured to create classified storage spaces, and input similar target images into the classified storage spaces, wherein the similar target images are corresponding target images having similarity within a set similarity threshold range; and
- a control module, configured to switch image extraction modes, to choose to use one-by-one extraction or extraction at intervals.

Embodiment 3

The present embodiment provides an electronic device, including:
- a processor; and
- a memory, for storing computer programs,
    wherein when the computer programs are executed by the processor, the processor is caused to execute the steps in the image data processing method according to any one of the above.

The basic principle and main features of the present disclosure and advantages of the present disclosure are shown and described in the above. Technicians in the art should understand that the present disclosure is not limited by the above embodiments, and the above embodiments and the description in the specification are merely preferred examples of the present disclosure, and are not used to limit the present disclosure. Various changes and improvements further could be made to the present disclosure without departing from the spirit and scope of the present disclosure, and all of these changes and improvements fall within the scope claimed in the present disclosure. The scope of protection claimed in the present disclosure is delimited by the claims attached and equivalents thereof.

What is claimed is:

1. An image data processing method, comprising steps of:
    S1, acquiring information of to-be-processed database data and a contrast image, and recording the to-be-processed database data as a target image set;
    S2, performing sharpness calculation on each of target images in the target image set by a weighted gradient algorithm, setting a sharpness threshold, and removing, if sharpness of the target images is smaller than the sharpness threshold, the target images from the target image set,
    wherein a method of performing sharpness calculation on the target images in the target image set by the weighted gradient algorithm is:

$$D(f) = \alpha \Sigma_x \Sigma_y |f(x+2,y) - f(x,y)|^2 + \beta \Sigma_x \Sigma_y |G(x,y)|,$$

in which, $D(f)$ is sharpness, $f(x, y)$ is a gray-scale value of a corresponding pixel point $(x, y)$ of a target image f, x and y respectively represent abscissa and ordinate of the pixel point, $G(x, y)$ is convolution of Laplacian operator of the pixel point $(x, y)$, $\alpha$ and $\beta$ are weighted values, and $\alpha + \beta = 1$;
    S3, performing sharpness enhancement processing on remaining target images in the target image set;
    S4, performing, after the sharpness enhancement processing, extraction on the remaining target images in the target image set and the contrast image one by one, to obtain feature points, and comparing and analyzing the extracted feature points; and
    S5, comparing and judging, based on the feature points obtained in S4, similarity between the remaining target images in the target image set and the contrast image by a similarity algorithm, creating classified storage spaces within a database, and inputting similar target images into the classified storage spaces, wherein the similar target images are corresponding target images having similarity within a set similarity threshold range.

2. The image data processing method according to claim 1, wherein in the S1, the image data in the target image set is classified according to time, and target image subsets {T1}, {T2}, . . . , {Tn} of different time categories are created.

3. The image data processing method according to claim 2, wherein in the S3, the sharpness enhancement processing comprises mean filtering denoising processing and adaptive threshold binarization enhancement processing.

4. The image data processing method according to claim 3, wherein when determining a target image subset to which one of the similar target images belongs, similarity judgement is performed on the target images in the target image subset to which the similar target image belong and in target image subsets therebefore and thereafter.

5. The image data processing method according to claim 4, wherein a calculation formula of the similarity algorithm is:

$W/P 100\% = G$;

in the formula: $W$ is a feature point of a target image, $P$ is a feature point of a contrast image, and $G$ is a ratio of the feature point $W$ of the target image to the feature point $P$ of the contrast image, i.e., similarity; and when $G \in [0.7, 1]$, it is determined that the similarity between the target image and the contrast image is large.

6. The image data processing method according to claim 5, wherein in the S4, the extracting the image data one by one is switched to extraction at intervals, wherein a number of intervals is set as n, and n is adjusted with magnitude of G.

7. A system configured for implementing the image data processing method according to claim 1, at least comprising:
an extraction module, configured to acquire information of to-be-processed database data and a contrast image, and record the to-be-processed database data as a target image set;
a sharpness processing module, configured to perform sharpness calculation on each of target images in the target image set by a weighted gradient algorithm, set a sharpness threshold, and remove, if sharpness of the target images is smaller than the sharpness threshold, the target images from the target image set; and perform sharpness enhancement processing on remaining target images in the target image set,
wherein a method of performing sharpness calculation on the target images in the target image set by the weighted gradient algorithm is:

$D(f) = \alpha \Sigma_x \Sigma_y |f(x+2,y) - f(x,y)|^2 + \beta \Sigma_x \Sigma_y |G(x,y)|$, in which, $D(f)$ is sharpness, $f(x, y)$ is a gray-scale value of a corresponding pixel point $(x, y)$ of a target image f, x and y respectively represent abscissa and ordinate of the pixel point, $G(x, y)$ is convolution of Laplacian operator of the pixel point $(x, y)$, $\alpha$ and $\beta$ are weighted values, and $\alpha + \beta = 1$;

a similarity calculation module, configured to perform, after the sharpness enhancement processing, extraction on the remaining target images in the target image set and the contrast image one by one, to obtain feature points, and compare, based on the feature points obtained, similarity between the remaining target images and the contrast image by a similarity algorithm according to the feature points;

a data storage module, configured to create classified storage spaces, and input similar target images into the classified storage spaces, wherein the similar target images are corresponding target images having similarity within a set similarity threshold range; and a control module, configured to switch image extraction modes, to choose to use one-by-one extraction or extraction at intervals.

8. An electronic device, comprising:

a processor; and a memory, configured for storing computer programs, wherein when the computer programs are executed by the processor, the processor is caused to execute the steps in the image data processing method according to claim 1.

* * * * *